(12) United States Patent
Basavanhally

(10) Patent No.: US 6,186,674 B1
(45) Date of Patent: Feb. 13, 2001

(54) OPTICAL SUB-ASSEMBLY PACKAGE MOUNT

(75) Inventor: Nagesh R. Basavanhally, Trenton, NJ (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/313,602

(22) Filed: May 18, 1999

Related U.S. Application Data

(63) Continuation-in-part of application No. 09/153,386, filed on Sep. 15, 1998, now Pat. No. 6,106,161.

(51) Int. Cl.[7] .............................. G02B 6/00; G02B 6/36
(52) U.S. Cl. ............................ 385/88; 257/84; 385/92
(58) Field of Search .................. 385/88, 93, 147; 372/50, 56; 359/362; 333/254; 257/772, 84, 81; 361/737; 438/112, 33, 423, 45, 46, 31

(56) References Cited

U.S. PATENT DOCUMENTS

| | | | |
|---|---|---|---|
| 5,333,225 | * 7/1994 | Jacobowitz et al. | 385/93 |
| 5,432,358 | 7/1995 | Nelson et al. | 257/81 |
| 5,499,312 | 3/1996 | Hahn et al. | 385/91 |
| 5,511,140 | * 4/1996 | Cina et al. | 385/93 |
| 5,537,504 | * 7/1996 | Cina et al. | 385/93 |
| 5,631,991 | * 5/1997 | Cohen et al. | 385/93 |
| 5,689,279 | 11/1997 | Nelson et al. | 345/82 |
| 5,700,987 | 12/1997 | Basavanhally | 219/56.1 |
| 5,990,560 | * 11/1999 | Coult et al. | 257/772 |
| 6,001,664 | * 12/1999 | Swirhun et al. | 438/31 |

OTHER PUBLICATIONS

N. Basavanhally, "Application of soldering technologies for opto-electronic component assembly", ASME Int. Electronic Packaging Conference, New York: ASME, 1993, pp. 1149–1155.

Y.C. Lee and N. Basavanhally, "Soldering engineering for optoelectronic packaging", J. Metals, Jun. 1994.

N.R. Basavanhally, M.F. Brady, and D. Bruce Buchholz, "Optoelectronic Packaging of Two-Dimensional Surface Active Device", IEEE Transactions on Components, Packaging, and Manufacturing Technology—Part B, vol. 19, No. 1.

* cited by examiner

*Primary Examiner*—Akm E. Ullah
(74) *Attorney, Agent, or Firm*—Synnestvedt & Lechner LLP

(57) ABSTRACT

Compliant, resilient mounting means are provided for minimizing stresses on the platform of an optical sub-assembly package that tend to be caused by such factors as the mounting of the package base to a rigid, external platform, as by bolting, so as to maintain good alignment between the laser beam emitted from a laser chip mounted on the platform and the lens of an optical fiber also mounted on the platform.

19 Claims, 3 Drawing Sheets

OPTICAL SUB-ASSEMBLY PACKAGE MOUNT

CROSS REFERENCE TO RELATED APPLICATION

This application is a continuation-in-part of application Ser. No. 09/153,386, filed Sep. 15, 1998 now U.S. Pat. No. 6,106,161.

FIELD OF THE INVENTION

This invention relates generally to optical sub-assemblies. More particularly it relates to the mounting of optical sub-assemblies (OSA's) in a package using means that provide sufficient resiliency to prevent or minimize distortion of the OSA and maintain proper optical alignment within the OSA when the package is subjected to mechanical stress, in particular, that caused by bolting the package to a rigid external platform and the like.

BACKGROUND OF THE INVENTION

Current pump laser packages typically include an optical sub-assembly that comprises a laser chip and an optical fiber that acts as a wave guide, both of which are mounted on a platform in proper optical alignment with each other. Often, the method employed to effect this alignment will depend on the degree of precision required (less precision is required for surface emitting lasers than for edge emitting lasers). For sub-assemblies comprising surface emitting lasers, where less precision is required, the alignment may be effected passively (e.g., using solder bumps and wettable pads, as taught, for example, in U.S. Pat. No. 5,499,312).

Bumps of solder (and other materials) have been used also to provide electrical conductivity in optical devices. Such use is disclosed, for example, in U.S. Pat. No. 5,689,279.

For applications where greater precision of alignment is required, as is the case for edge emitting laser chips, the alignment is effected actively, by activating the laser and moving it relative to the optical wave guide until maximum transmission is achieved. Once the alignment of laser to fiber is achieved, both the laser and the optical fiber are fixed to a platform, which is, in turn, mounted on a base, typically using solder to form a rigid joint. The fiber also is fixed to the package by using either welding or a solder joint to form a hermetic seal. The package base, in turn, is generally bolted to a rigid external platform. Such active alignment and bonding techniques are described in U.S. Pat. No. 5,700,987, the contents of which are hereby incorporated herein by reference.

The joint between the optical sub-assembly platform and the base serves as the main means for dissipating heat generated by the laser when it is being operated. Because of other structural requirements, the portion of the platform supporting the laser and the portion to which the fiber sheath is attached usually are formed of different materials. For example, the portion of the platform on which the laser chip is mounted can be beryllium oxide (BeO) whereas the portion of the platform to which the optical fiber sheath is attached may be Kovar. Also, the package base to which the optical sub-assembly platform is joined typically is made of yet another material, for example, copper/tungsten (CuW). Each of these materials has a different coefficient of expansion from that of the other materials. Upon heating or cooling of the package, the differential expansion or contraction causes stresses that tend to distort the sub-assembly platform. Any such distortion would tend to cause misalignment of the laser and fiber, thereby reducing the efficiency of the device. Similarly, stresses that tend to cause misalignment by distorting the sub-assembly are typically created when the package base is bolted to an external platform.

In copending parent application Ser. No. 09/153,386, the contents of which are hereby incorporated herein by reference, there is a description of resilient mounting means comprising resilient solder bumps, typically of the order of 625 microns thick, that are used to attach the sub-assembly platform to the package base. Said mounting means, which replace the rigid solder connection of the typical prior art optical sub-assembly, provide similar heat transfer from the platform to the base as was provided by the rigid prior art mounting means, while, at the same time, providing sufficient resiliency in the connection between the base and the platform to minimize stress on the platform and thereby prevent or minimize misalignment between the optical laser beam and the lens of the optical fiber. (The stress that otherwise would be transferred to the platform from the base could result from differential expansion or contraction due to temperature changes in the device or from forces arising from bolting or otherwise attaching the package base to a rigid external platform.)

SUMMARY OF THE INVENTION

The present invention provides alternative resilient mounting means for an optical sub-assembly so as to minimize distortion during bolting of the package to a rigid metal plate or other housing, said means comprising cut-outs in the package base. The invention thereby provides improved retention of alignment between the optical laser beam and the optical fiber lens on the sub-assembly by minimizing stresses on the sub-assembly platform. This enhanced alignment of the sub-assembly, in turn, enhances the efficiency of the device of which the sub-assembly is a part. Preventing misalignment is particularly important for optical sub-assemblies that employ edge-emitting laser devices. Thus, the tolerances for such devices are of the order of 0.2 to 0.3 microns.

In accordance with a first embodiment of the present invention, the package base on which the sub-assembly is mounted is modified to provide the requisite resiliency. More particularly, as described in greater detail hereafter, cut-out means are provided near the foot of the package base so that the stresses otherwise associated with affixing the package base, at the foot thereof, to an external plate or housing are minimized. In accordance with a second embodiment, the package base cut-out feature is used in combination with the resilient bump expedient disclosed and claimed in application Ser. No. 09/153,386 now allowed.

DETAILED DESCRIPTION OF THE INVENTION

Figure 1:
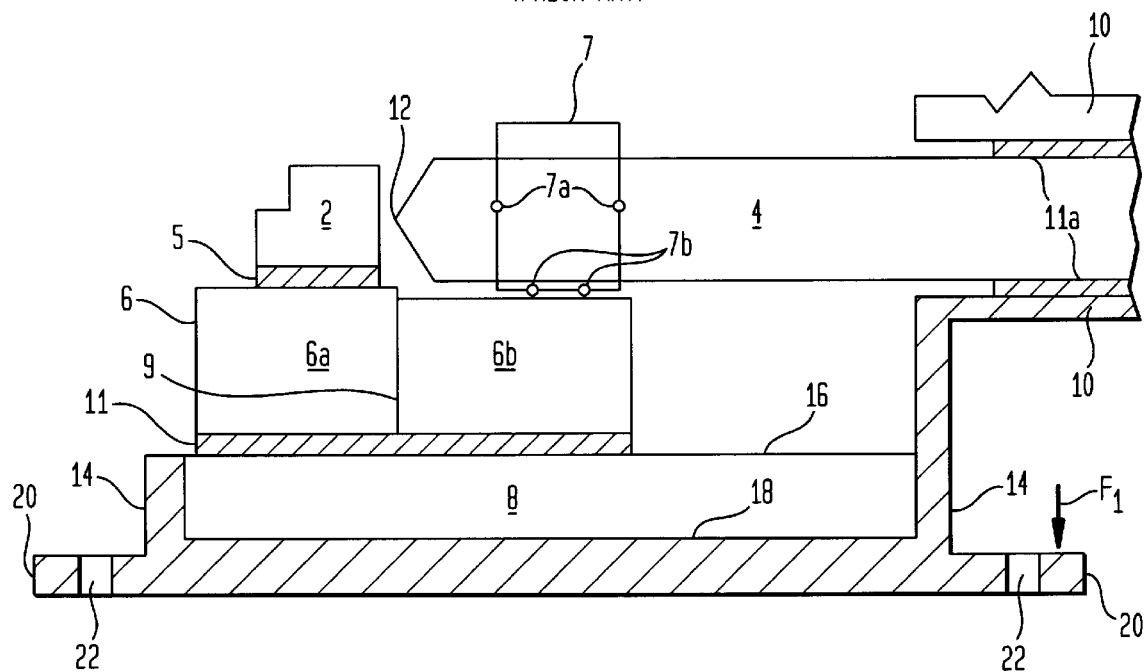
FIG. 1 is a sectional view showing an optical sub-assembly attached to a package base in accordance with the prior art.

As shown in FIG. 1, conventional pump laser packages contain an optical sub assembly (OSA) that includes a laser chip (2) and an optical fiber sleeve (4), both of which are mounted on a platform (6) by conventional means, such as solder joint (5) and clip (7). The clip (7), which is formed of a weldable metal such as Kovar, is attached to the fiber sleeve (4) by weld (7a). A similar weld (7b) is used to attach clip (7) to the platform (6b). Platform (6) is mounted on a package base (8) on which is provided a snout (10) to which optical fiber sleeve (4) is fixed. In the conventional package of FIG. 1, the OSA is attached to the base by solder joint (11) between the platform and the base. The metallic fiber sleeve (4) and the snout (10) are joined to form a hermetic seal by solder joint or weld (11a).

Figure 2:
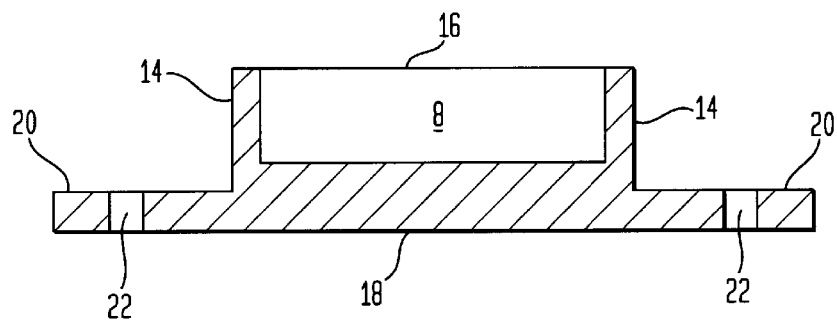
FIG. 2 is a sectional view of the package base of FIG. 1.

Referring to FIGS. 1 and 2, base (8) includes side walls (14), top wall (16) and bottom wall (18). Extending outwardly from bottom wall (18) are mounting flanges or feet (20). Flanges or feet (20) are provided with apertures (22) for receiving bolts or the like (not shown) for mounting the sub-assembly to an external plate or housing (also not shown).

For proper operation, there must be proper alignment between the laser beam emanating from the chip and the lens of the optical fiber (not shown). This alignment is depicted as being at point (12). As indicated above, for devices employing edge emitting laser chips, such as the depicted device, the tolerances for such alignment are typically of the order of 0.2 to 0.3 microns.

Solder joints (11), as currently employed in the OSA depicted in FIG. 1, are continuous, of the order of 125 microns thick, providing a rigid seal with good heat transfer properties. However, the rigidity of the seal creates too much inflexibility in the attachment between the OSA platform (6) and the base (8). Thus, platform (6) may be constructed of a BeO portion (6a) and a Kovar portion (6b), joined together as at interface (9) by brazing or other suitable means, whereas base (8) may be CuW. Stresses created by bolting the sub-assembly package onto an external plate or housing cause distortion in the OSA, thereby disturbing the alignment at 12 and reducing the light coupling between the laser and the fiber. This, in turn, reduces the efficiency of the device.

Figure 3:
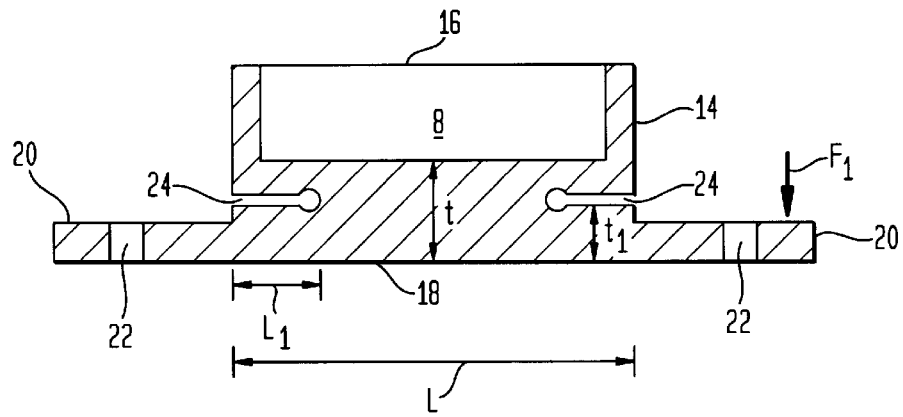
FIG. 3 is a sectional view of a package base similar to that of FIG. 2 but modified in accordance with a first embodiment of the present invention.
Figure 4:
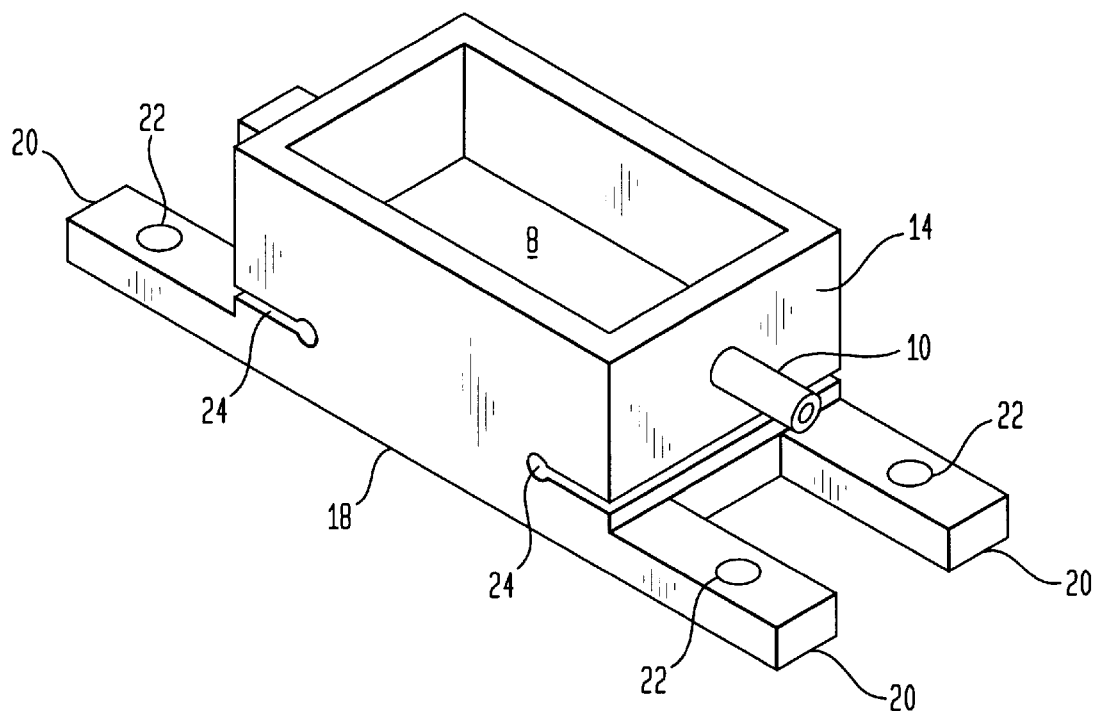
FIG. 4 is a perspective view of the package base of FIG. 4.

In accordance with the first embodiment of the present invention, means are provided for improving the overall resiliency of the sub-assembly so as to better maintain alignment of the laser beam and the optical fiber by reducing the stresses associated with mounting the device to an external platform. As shown in FIGS. 3 and 4, in a first embodiment of the invention, these means comprise cut-outs (24) provided in the bottom wall (18) of package base (8) adjacent to flanges or feet (20). As indicated above and as can be seen from the Figures, cut-outs 24 add considerable resiliency to the sub assembly, by reducing the rigidity of the connection between wall 18 and walls 14 as well as feet 20, thus preventing misalignment of the laser beam with the optical fiber that otherwise would occur due to stresses created by bolting the sub assembly to an external platform.

Figure 5:
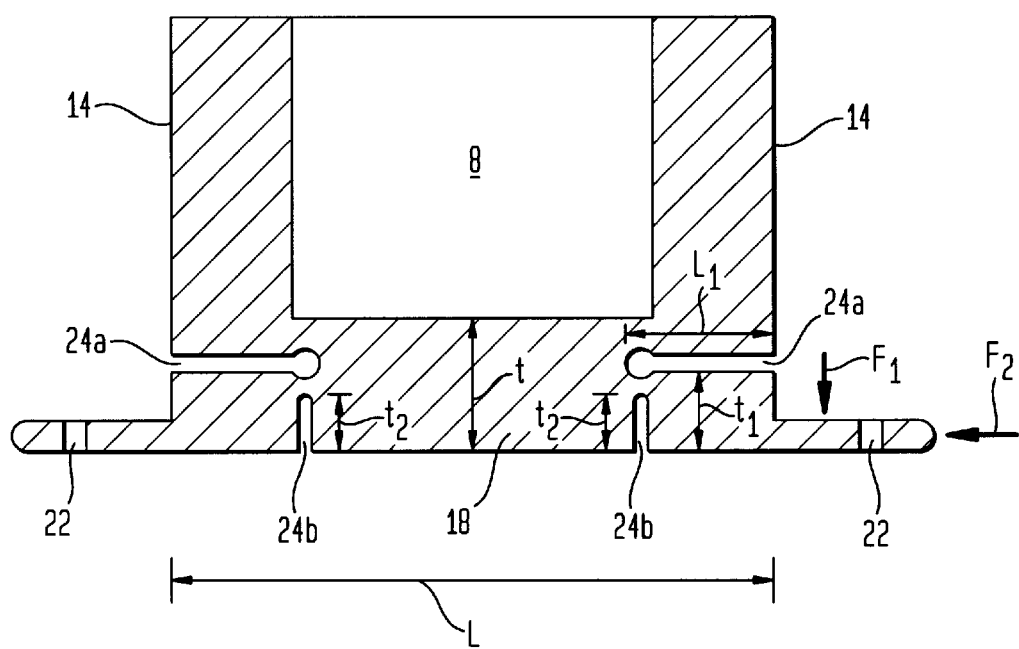
FIGS. 5 and 6 are sectional views similar to FIG. 3 but showing alternative configurations for the cut-out means shown in FIG. 3.
Figure 6:
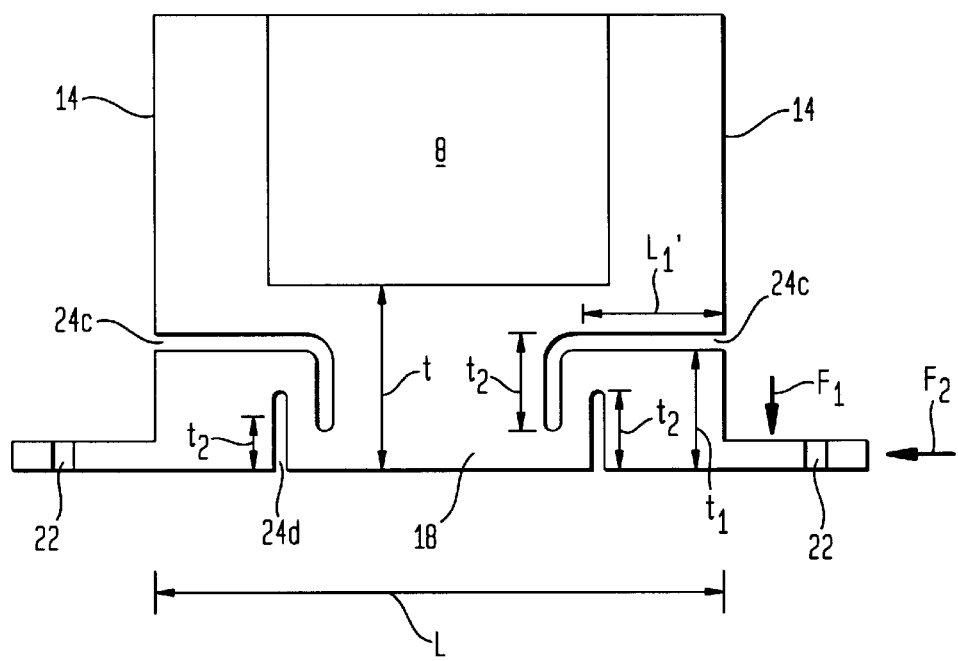

As illustrated in FIGS. 3 and 4, cut-outs 24 extend horizontally through the depth of wall 18 and are substantially parallel to the lower and upper surfaces of bottom wall 18. Alternative configurations for the cut-outs, that also provide added resiliency, are shown in FIGS. 5 and 6. In the illustrations of both FIGS. 5 and 6, more than one cut-out is employed at each end of wall 18. As illustrated in FIG. 5, cut-outs 24a and 24b are provided, with horizontal cut-out 24a being similar in configuration to cut-out 24 of FIG. 3, while vertical cut-out 24b is substantially perpendicular to cut-out 24a. Such configuration is effective not only for relieving stress caused by the bolting force (F1), but also stress caused by the force (F2) due to the difference between the heat of expansion of the material of construction of wall 18 and that of the material of construction of the external platform (not shown) to which the package is eventually bolted through holes 22. The configuration of cut-out 24c of FIG. 6 is similar to those of cut-outs 24 and 24a, except that cut-out 24c is longer than cut outs 24 and 24a and has a vertical end component as well as a horizontal component. Cut-out 24d of FIG. 6 is similar in configuration to cut-out 24b of FIG. 5. Other configurations that serve the same purpose will be apparent to those skilled in the art.

Important factors for determining the degree of resilience afforded by the cut-outs in accordance with the invention include the relationships between dimensions of the cut-outs and the dimensions of portions of bottom wall 18. Thus, the smaller the ratio of $t_1$, the thickness of the portion of bottom wall 18 between horizontal cut-out 24, 24a or 24c and the lower surface of wall 18, to t, the total thickness of wall 18, the greater the resiliency. Generally, in the practice of this invention, the ratio $t_1/t$ is in the range of from about 0.6 to about 0.7. Similarly, in the embodiments illustrated in FIGS. 5 and 6, the resiliency increases as the ratio $t_1/t_2$ decreases, where $t_1$ is as defined above and $t_2$ is the length of the vertical cut-out (24b, 24d, or the vertical component of cut-out 24c). Generally, in the illustrated embodiments, the ratio $t_1/t_2$ is in the range of about 2.4 to 2.8. On the other hand, resilience increases with increase in the ratio of $L_1$ or $L_1'$ to L, where L is the total length of bottom wall 18, $L_1$ is the length of horizontal cut-out 24 or 24a and $L_1'$ is the length of the horizontal portion of cut-out 24c. The ratio $L_1/L$ is generally in the range of from about 0.067 to about 0.1; the ratio $L_1'/L$ is generally from about 0.13 to about 0.15. In the illustrated preferred embodiments, the cut-outs extend through the entire depth of bottom wall 18. The vertical cut-outs 24b and 24d and the vertical components of cut-outs 24c are located at a distance from the adjacent vertical side surface of wall 18 that is substantially the same as the length $L_1$ or $L_1'$ of horizontal cut-outs 24a and 24c, respectively.

In the practice of this invention, the cut-outs (24, 24a, 24b, 24c, 24d) are provided in the bottom wall (18) of base (8) using conventional EDM (electrical discharge machining) technology. In accordance with this technology, the cut is effected by a 5 mil thick wire that erodes the metal by spark discharge. In practice, the cut-out generally extends through the total depth of wall (18) and is from about 10 to about 15 mils wide, preferably about 12 mils wide. Typically, t is from about 55 to about 65 mils, preferably about 60 mils; $t_1$ is from about 35 to about 41 mils, preferably about 38 mils and $t_2$ is about 14 to about 16 mils, preferably about 15 mils. Generally, $L_1$ is from about 60 to about 80 mils, preferably about 70 mils, $L_1'$ is from about 110 to about 130 mils, preferably about 120 mils, while L, the length of bottom wall (18) of base (8), is from about 800 to about 900 mils, preferably about 850 mils. Typically, flanges (20) are about 15 to about 25 mils thick and about 160 to about 200 mils long, and side walls (14) are about 10 to about 16 mils thick.

Figure 7:
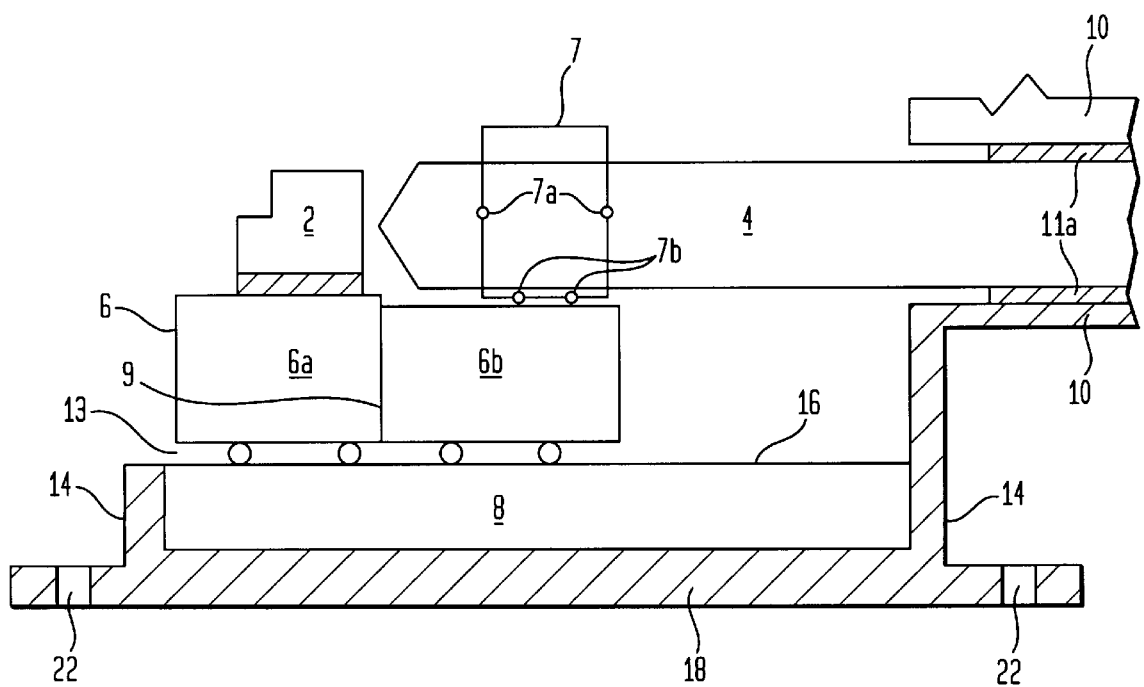
FIG. 7 is a sectional view similar to FIG. 1 but showing a second embodiment of the invention in which the package base is modified as shown in FIG. 3 (in accordance with the first embodiment of the present invention) and, in addition, further resiliency is provided by attachment of the optical sub-assembly to the package base by resilient solder bump mounting means in accordance with the disclosure of application Ser. No. 09/153,386.

As shown in FIG. 7, a more resilient connection of platform (6) to base (8) may be achieved by replacing the solder joint (11) of FIG. 1 with thicker (preferably of the order of 625 microns thick) solder bumps (13) in accordance with the invention described in copending application Ser. No. 09/153,386. In this way, the heat transfer properties between platform (6) and base (8) are maintained, but the rigid connection of the OSA platform (6) to the base (8) is replaced by a much more resilient one, which greatly reduces the stresses on the OSA platform. By this expedient, the proper alignment of the laser beam with the fiber lens is better maintained, thus improving the operating efficiency of the device.

Thus, as illustrated in FIG. 7, in accordance with a second embodiment of the invention, there is included in the sub-assembly of the present invention, in addition to cut-out (24), the resilient solder bumps (13) disclosed in application Ser. No. 09/153,386.

In the practice of the second embodiment of this invention, the solder bumps may vary in thickness between about 500 and about 750 microns. For best practical results, it has been found that the solder bumps should be between about 600 and 650 microns thick, more preferably about 625 microns thick. Preferably, they are uniformly distributed along the interface between platform (6) and base (8) at distances of from about 1250 to about 2500 microns from center to center, although patterns can vary. While other solder alloys may be usable, it has been found that lead/tin/silver (Pb/Sn/Ag) alloys provide an excellent combination of heat transfer, bonding and resiliency properties. Other alloys that are suitable for the solder bumps include bismuth/tin (Bi/Sn), lead/tin (Pb/Sn) and indium/silver (In/Ag). The solder bumps may be applied at the desired locations on the facing surfaces of platform (6) or base (8) by conventional means, such as by using commercially available solder preforms or solder balls.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

What is claimed is:

1. An optical sub-assembly package comprising:
  (A) a package base having a top wall, a bottom wall and side walls between said top and bottom walls, said walls having upper and lower horizontal surfaces;
  (B) a sub-assembly platform mounted to said top wall of said package base;
  (C) a light emitting laser chip;
  (D) an optical fiber assembly including an optical fiber lens for receiving light from said light emitting laser chip;
  (E) said light emitting laser chip and said optical fiber assembly being mounted on said platform in such manner as to provide proper alignment therebetween so as to maximize light from said chip that impinges on said lens;
  (F) at least one mounting flange extending outwardly from said lower horizontal surface of said bottom wall of said base for mounting said base to an external housing; and
  (G) a cut-out in said bottom wall adjacent said flanges for providing resiliency to said sub assembly so as to maintain said proper alignment between said light emitting chip and said fiber assembly.

2. The optical sub-assembly package of claim 1, wherein said light emitting laser chip is adapted to emit light from an edge thereof.

3. The optical sub-assembly package of claim 1, wherein said means for receiving light comprises an optical fiber lens on the end of the optical fiber assembly, said lens being so aligned with said laser chip as to receive substantially the maximum amount of light emitted from said laser chip.

4. The optical sub-assembly package of claim 1, wherein said sub-assembly platform is mounted to said package base by resilient mounting means.

5. The optical sub-assembly package of claim 4, wherein said resilient means comprises a multiplicity of solder bumps.

6. The optical sub-assembly package of claim 5, wherein said solder bumps are comprised of a lead/tin/silver alloy.

7. The optical assembly of claim 1, which comprises a cut-out that has a horizontal component that is parallel to the lower horizontal surface of said bottom wall.

8. The optical assembly of claim 1, which comprises a cut-out that has a vertical component that is perpendicular to the lower surface of said bottom wall.

9. The optical assembly of claim 7, wherein said cut-out comprises a vertical component that is perpendicular to the lower surface of said bottom wall.

10. The optical assembly of claim 1, which comprises a first cut-out that has a horizontal component that is parallel to the lower horizontal surface of said bottom wall and a second cut-out that has a vertical component that is perpendicular to said lower horizontal surface of said bottom wall.

11. The optical sub-assembly of claim 7, wherein the ratio of the distance ($t_1$) between the horizontal component of said cut-out and the lower surface of said bottom wall to the distance (t) between the upper and lower surfaces of said bottom wall is between about 0.6 and about 0.7.

12. The optical sub-assembly of claim 10, wherein the ratio of the distance ($t_1$) between the horizontal component of said first cut-out and the lower surface of said bottom wall to the length ($t_2$) of the vertical component of said second cut-out is between about 2.4 and about 2.8.

13. The optical sub-assembly of claim 7, wherein the ratio of the length ($L_1$) of said horizontal cut-out component to the length (L) of said bottom wall is from about 0.067 to about 0.1.

14. The optical sub-assembly package of claim 5, wherein said solder bumps are from about 500 to about 750 microns in thickness.

15. The optical sub-assembly package of claim 5, wherein said solder bumps are from about 600 to about 650 microns in thickness.

16. The optical sub-assembly package of claim 5, wherein said solder bumps are spaced apart from each other at distances of from about 1250 to about 2500 microns from center to center.

17. The optical sub-assembly package of claim 1, wherein said bottom wall is from about 55 to about 65 mils thick and said cut-out is from about 10 to about 15 mils wide.

18. The optical sub-assembly of claim 9, wherein the distance of said vertical component of said cut out from an adjacent side surface of said bottom wall is approximately equal to the horizontal length of said horizontal cut-out component.

19. The optical sub-assembly of claim 1, wherein said cut out extends through the total depth of said bottom wall.

* * * * *